(12) United States Patent
Doetsch et al.

(10) Patent No.: US 6,639,937 B2
(45) Date of Patent: Oct. 28, 2003

(54) METHOD AND APPARATUS FOR PRODUCING SPREAD-CODED SIGNALS

(75) Inventors: Markus Doetsch, Schlieren (CH); Peter Jung, Otterberg (DE); Jörg Plechinger, München (DE); Peter Schmidt, Ellerstadt (DE); Michael Schneider, München (DE); Tideya Kella, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/113,419

(22) Filed: Apr. 1, 2002

(65) Prior Publication Data

US 2002/0154678 A1 Oct. 24, 2002

Related U.S. Application Data

(63) Continuation of application No. PCT/DE00/03347, filed on Sep. 22, 2000.

(30) Foreign Application Priority Data

Sep. 30, 1999 (DE) .......................... 199 47 019

(51) Int. Cl.⁷ ............................................. H04B 01/69
(52) U.S. Cl. ........................ 375/130; 375/285; 375/296
(58) Field of Search ................................. 375/130, 146, 375/147, 260, 295, 316, 317, 319, 326, 344, 345, 362, 271, 278, 284, 285, 296, 302; 370/320, 335, 342, 350, 441; 455/324, 245.1, 250.1, 232.1, 240.1, 247.1, 501, 63, 67, 3.91, 110, 115

(56) References Cited

U.S. PATENT DOCUMENTS 5,361,276 A * 11/1994 Subramanian .............. 375/150
5,751,739 A    5/1998 Seshadri et al.
5,838,733 A    11/1998 Bruckert
5,909,471 A *  6/1999 Yun .............................. 375/343
5,940,434 A    8/1999 Lee et al.
6,108,369 A *  8/2000 Ovesjo et al. ............... 375/146
6,178,197 B1 * 1/2001 Froelich et al. ............. 375/150
6,393,047 B1 * 5/2002 Popovic' .................... 375/140
6,442,383 B1 * 8/2002 Iemura ........................ 455/312
6,445,736 B1 * 9/2002 Wheeler ...................... 375/235

FOREIGN PATENT DOCUMENTS

DE          42 23 132 A1    1/1994

OTHER PUBLICATIONS

J.S. Walther: "A unified algorithm for elementary functions", Spring Joint Conference, 1971, pp. 379–385.
Jack E. Volder: "The CORDIC Trigonometric Computing Technique", IRE Transactions on Electronic Computers, vol. 8, Sep. 1959, pp. 330–334.
Mark Vanderaar et al.: "Transmit Pulse Shaping Filters And CORDIC Algorithm Based On Precompensation For Digital Satellite Communications", Proceeding of the 39th Midwest Symposium on Circuits and Systems, Ames, IA, Aug. 18–21, 1996, vol. 3, pp. 1219–1222.
Fredrik Ovesjö: "UTRA Physical Layer Description FDD parts", European Telecommunications Standard, Jun. 25, 1998, pp. 1–41.

* cited by examiner

Primary Examiner—Chi Pham
Assistant Examiner—Khanhcong Tran
(74) Attorney, Agent, or Firm—Laurence A. Greenberg; Werner H. Stemer; Gregory L. Mayback

(57) ABSTRACT

Transmission data that will be transmitted is coded and thus band-spread using a spread code. The band-spread transmission data is also coded using a scrambling code. The scrambling process is followed by pulse shaping, frequency correction, and DC offset and/or amplitude compensation for the band-spread and scrambled transmission data.

27 Claims, 7 Drawing Sheets

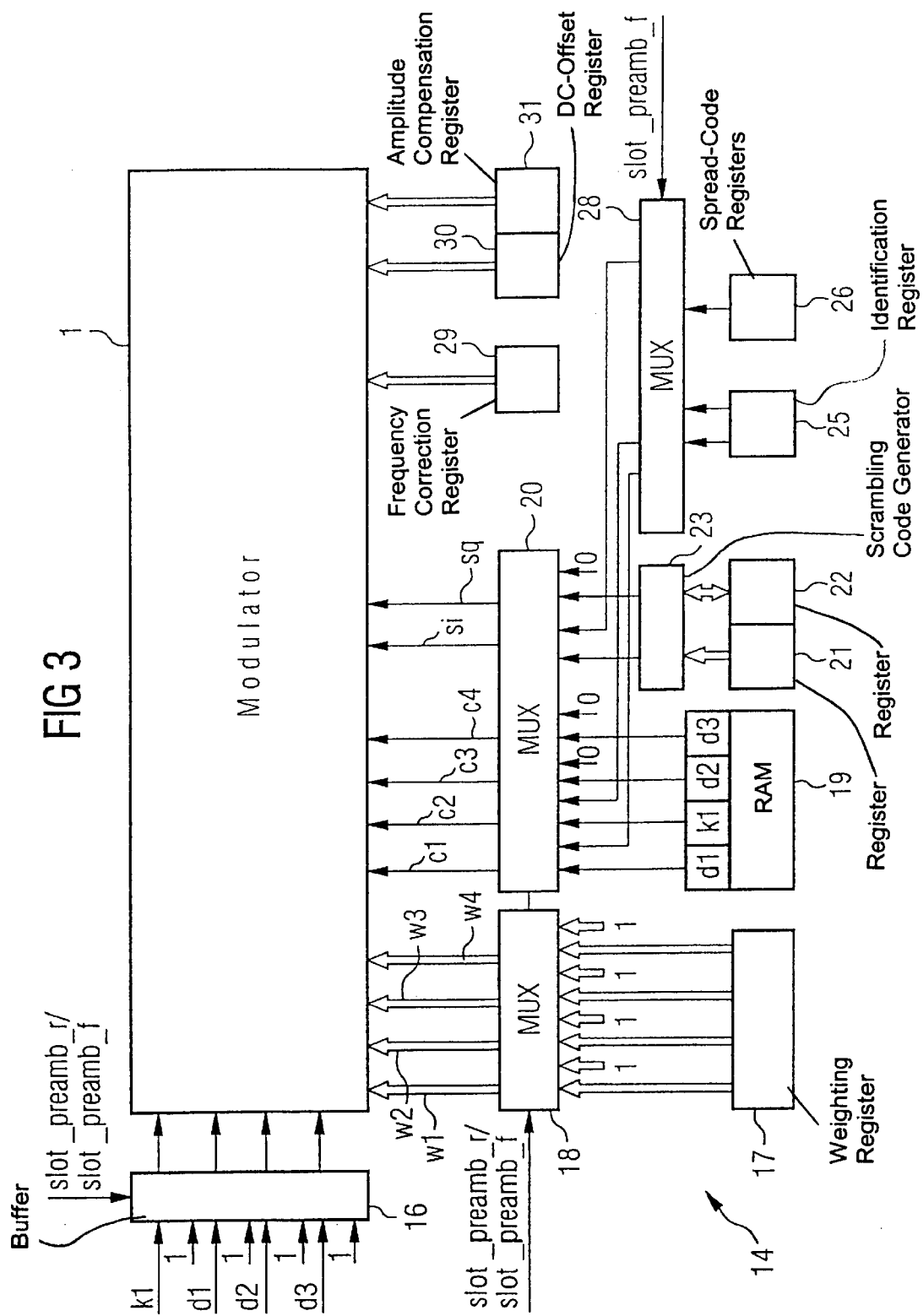

FIG 7

| | | | | | | | | | | | | | | | | |
|---|---|---|---|---|---|---|---|---|---|---|---|---|---|---|---|---|
| 1 | 1 | 1 | 1 | -1 | -1 | -1 | 1 | -1 | -1 | 1 | 1 | -1 | 1 | -1 | 1 | 1 |
| 2 | -1 | 1 | -1 | -1 | 1 | 1 | 1 | -1 | 1 | 1 | 1 | -1 | -1 | 1 | -1 | 1 |
| 3 | 1 | -1 | 1 | 1 | 1 | -1 | 1 | 1 | -1 | 1 | 1 | 1 | -1 | 1 | -1 | 1 |
| 4 | -1 | 1 | -1 | 1 | -1 | -1 | -1 | -1 | -1 | 1 | -1 | 1 | -1 | 1 | 1 | 1 |
| 5 | 1 | -1 | -1 | -1 | -1 | 1 | 1 | -1 | -1 | -1 | -1 | 1 | -1 | -1 | -1 | 1 |
| 6 | -1 | -1 | 1 | -1 | 1 | -1 | 1 | -1 | 1 | -1 | -1 | 1 | 1 | 1 | 1 | 1 |
| 7 | -1 | 1 | 1 | 1 | -1 | -1 | 1 | 1 | 1 | -1 | -1 | -1 | -1 | -1 | -1 | 1 |
| 8 | 1 | 1 | -1 | -1 | -1 | -1 | -1 | 1 | 1 | -1 | 1 | 1 | 1 | 1 | -1 | 1 |
| 9 | 1 | -1 | 1 | -1 | -1 | 1 | -1 | 1 | 1 | 1 | -1 | -1 | -1 | 1 | 1 | 1 |
| 10 | -1 | 1 | 1 | -1 | 1 | 1 | -1 | 1 | -1 | -1 | 1 | 1 | -1 | -1 | 1 | 1 |
| 11 | 1 | 1 | 1 | 1 | 1 | 1 | -1 | -1 | 1 | 1 | -1 | 1 | 1 | -1 | -1 | 1 |
| 12 | 1 | 1 | -1 | 1 | 1 | 1 | 1 | 1 | -1 | -1 | -1 | -1 | 1 | 1 | 1 | 1 |
| 13 | 1 | -1 | -1 | 1 | 1 | -1 | -1 | -1 | 1 | -1 | 1 | -1 | -1 | -1 | 1 | 1 |
| 14 | -1 | -1 | -1 | 1 | -1 | 1 | 1 | 1 | 1 | 1 | 1 | 1 | -1 | 1 | 1 | 1 |
| 15 | -1 | -1 | -1 | -1 | 1 | -1 | -1 | 1 | -1 | 1 | -1 | -1 | 1 | -1 | -1 | 1 |
| 16 | -1 | -1 | 1 | 1 | -1 | 1 | -1 | -1 | -1 | -1 | 1 | -1 | 1 | 1 | -1 | 1 |

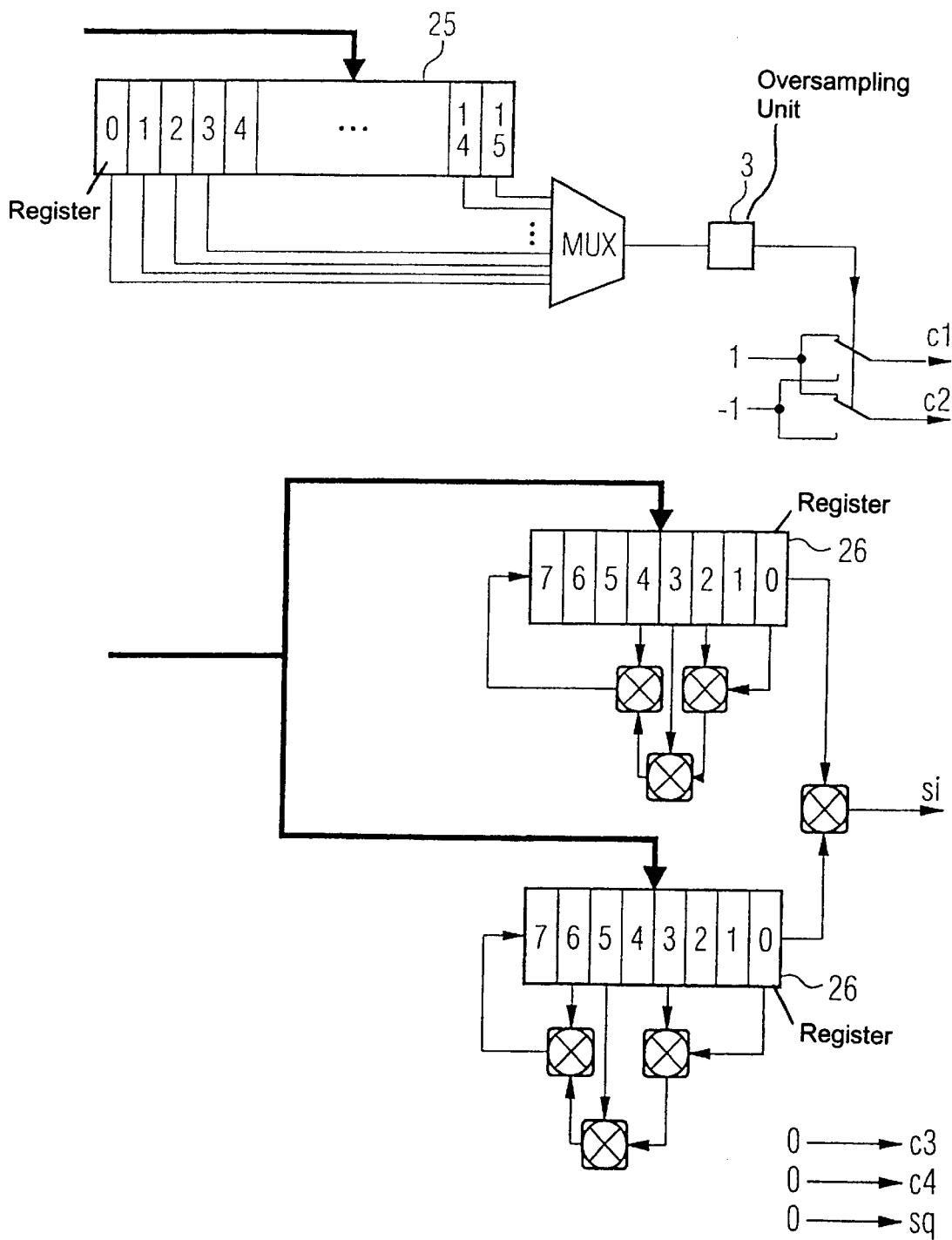

METHOD AND APPARATUS FOR PRODUCING SPREAD-CODED SIGNALS

CROSS-REFERENCE TO RELATED APPLICATION

This application is a continuation of copending International Application No. PCT/DE00/03347, filed Sep. 22, 2000, which designated the United States.

BACKGROUND OF THE INVENTION

FIELD OF THE INVENTION

The present invention relates to a method and to an apparatus for producing spread-coded signals, in particular spread-coded mobile radio signals.

Telecommunication is one of the fastest developing technologies. In the mobile radio field, work is currently being carried out on the standardization and development of what is referred to as third-generation mobile radio, which is referred by the term UMTS (Universal Mobile Telecommunications System) and envisages a world-wide uniform mobile radio standard.

According to the UMTS mobile radio standard, what is referred to as CDMA (Code Division Multiple Access) is used as the multiple access method. This is a multiple access method in which all the subscribers to the corresponding mobile radio system are allowed to use the entire available system bandwidth at the same time. In order to make it possible, despite this, to avoid collisions between the individual subscribers, the individual subscriber signals are provided with different code sequences which thus allow unique association of the received signals. During this process, the individual signals are spread, as a result of which the bandwidth is multiplied, so that this technique is also referred to as the spread-spectrum technique. In particular, the subscriber data that will be transmitted is multiplied or spread using a code sequence which is independent of the data that will be transmitted. The band-spread signal obtained in this way is then modulated onto a radio-frequency carrier, and is transmitted to a corresponding receiver. The receiver demodulates this band-spread signal and carries out despreading, using a code sequence which is synchronized to the transmitter. The receiver admittedly receives not only the desired signal from the transmitter, but also additional signals from other transmitters, transmitting in the same frequency band. However, the despreading process ensures that the only signal which is despread and whose bandwidth is reduced is that which uses the same and synchronous spread code as the receiver, so that, after the despreading process, the desired signal can easily be filtered out.

While transmission apparatus for digitally producing mobile radio transmission signals for different mobile radio standards, in particular, for example, for the currently normally used GSM (Global System for Mobile Communication) mobile radio standard, are already known, the problem of producing spread-modulated signals in mobile terminals for third-generation mobile radio has not yet been solved.

The UMTS standard "Ultra physical layer description FDD parts", Ovesjö Fredrik, European Telecommunication Standard, XX, XX, Jun. 25, 1998 (1998-06-25), pages 1 to 41, describes a method for producing spread-coded signals, in which a signal is subjected to spread coding and to subsequent scrambling. The band-spread and scrambled signal is then filtered in an RRC filter.

The technical article "Transmit pulse shaping filters and CORDIC algorithm based precompensation for digital satellite communications", M. Vandermaar et al., IEEE Proceedings of the 39th Midwest Symposium on Circuits and Systems (Cat. No. 96CH35995), AMES, IA, USA, Aug. 18–21, 1996, pages 1219 to 1222, Vol. 3, 1996, New York, N.Y., USA, IEEE; USA ISBN: 0-7803-3636-4) describes an algorithm for precompensation for non-linearities that occur in a signal amplifier. The compensator has two CORDIC (Coordinate Rotation Digital Computer) stages, which carry out a coordinate transformation on the signal from cartesian coordinates to polar coordinates, and vice versa. The computation steps for the actual signal compensation are carried out between the two CORDIC stages.

U.S. Pat. No. 5,838,733 describes a transmitting device, in which a digital signal that will be transmitted is subjected to programmable amplification and to amplitude limiting.

SUMMARY OF THE INVENTION

It is accordingly an object of the invention to provide an apparatus and a method for producing spread-coded signals which overcome the above-mentioned disadvantages of the prior art apparatus and methods of this general type.

In particular, it is an object of the invention to provide an apparatus and a method for producing spread-coded signals that can be used, in particular, in third generation mobile radio transmitters.

Furthermore, it is an object of the invention to enable spread-coded signals to be produced in accordance with different mobile radio standards, for example, in accordance with the UMTS or IS-95 standard.

With the foregoing and other objects in view there is provided, in accordance with the invention, a method for producing spread-coded signals that includes steps of: coding and band-spreading transmission data using a spread code to obtain band-spread transmission data; coding the band-spread transmission data using a scrambling code to obtain band-spread and scrambled transmission data and then pulse shaping the band-spread and scrambled transmission data; subjecting the band-spread and scrambled transmission data to frequency correction; and in a signal path downstream from the frequency correction, subjecting the band-spread and scrambled transmission data to an operation selected from the group consisting of a DC offset operation and an amplitude compensation operation.

In accordance with an added mode of the invention, the pulse shaping is performed by Root Raised Cosine filtering using a roll-off factor of approximately 0.22.

In accordance with an additional mode of the invention, during the pulse shaping, the band-spread and scrambled transmission data is oversampled using a specific oversampling factor.

In accordance with another mode of the invention, the oversampling factor is four.

In accordance with a further mode of the invention, digital frequency offset correction is used for the frequency correction; a rotation angle is used for the frequency correction that is represented as a linear combination of microrotations; and the microrotations are performed as a function of a frequency offset by selectively using a CORDIC algorithm.

In accordance with a further added mode of the invention, the method includes: performing both the DC offset operation and the amplitude compensation operation; performing the DC offset compensation by adding a specific DC offset compensation value to the band-spread and scrambled transmission data; and performing the amplitude compensation by multiplying the band-spread and scrambled transmission data by a specific amplitude compensation value.

In accordance with a further additional mode of the invention, before the transmission data is coded using the spread code, the transmission data is weighted by multiplying the transmission data by a weighting factor. Subsequently, the transmission data is oversampled.

In accordance with yet an added mode of the invention, the method includes using an over-sampling factor to perform the step of oversampling the transmission data such that when the subsequent step of coding the transmission data using the spread code is performed, a maximum chip rate is obtained.

In accordance with yet an additional mode of the invention, the method includes performing the step of coding and band-spreading the transmission data, the step of coding the band-spread transmission data using the scrambling code, the step of pulse shaping the band-spread transmission data, the step of frequency correction, and the step of oversampling the transmission data by:

obtaining the transmission data from a plurality of physical channels, each providing first transmission data;

for each one of the plurality of the physical channels and separately from others of the plurality of the physical channels, weighting, oversampling, and coding the first transmission data using a channel-specific spread code;

after being coded using the spread code, combining the first transmission data of the plurality of the physical channels to form an I branch carrying second transmission data and a Q branch carrying third transmission data;

scrambling the second transmission data, and then pulse shaping the second transmission data, frequency correcting the second transmission data, and subjecting the second transmission data to an operation selected from the group consisting of a DC offset compensation operation, and an amplitude compensation operation; and separately from the second transmission data, scrambling the third transmission data, and then pulse shaping the third transmission data, frequency correcting the third transmission data, and subjecting the third transmission data to an operation selected from the group consisting of a DC offset compensation operation, and an amplitude compensation operation.

In accordance with yet an additional mode of the invention, the method includes using a modulator to perform the step of coding and band-spreading the transmission data, the step of coding the band-spread transmission data using the scrambling code, the step of pulse shaping the band-spread transmission data, the step of frequency correction, and the operation selected from the group consisting of the DC offset operation and the amplitude compensation operation. The modulator is programmed by using a control bus to provide operating parameters to the modulator.

With the foregoing and other objects in view there is also provided, in accordance with the invention, an apparatus for producing spread-coded signals that includes: a spread coding device for coding transmission data using a spread code to obtain spread-coded transmission data, the transmission data being for subsequent transmission; a scrambling device for scrambling the spread-coded transmission data with a scrambling code; and a signal preprocessing device receiving the transmission data from the scrambling device. The signal-preprocessing device includes a device for pulse shaping. The signal-preprocessing device includes a device for frequency correction. The signal-preprocessing device includes a given device for performing an operation selected from the group consisting of a DC offset compensation operation and an amplitude compensation operation. The given device is configured downstream from the device for frequency correction.

In accordance with an added feature of the invention, the device for pulse shaping includes a Root Raised Cosine filter device for pulse shaping.

In accordance with an additional feature of the invention, the Root Raised Cosine filter device has a roll-off factor of approximately 0.22.

In accordance with another feature of the invention, during the pulse shaping process, the Root Raised Cosine filter device uses a specific oversampling factor to oversample the transmission data output from the scrambling device.

In accordance with a further feature of the invention, the device for frequency correction includes a digital frequency correction device. The digital frequency correction device includes microrotation units that are connected in series. The microrotation units use a CORDIC algorithm to correct any frequency offset, and the microrotation units are driven selectively as a function of the frequency offset.

In accordance with a further added feature of the invention, the given device includes a DC offset and amplitude compensation device for performing the operation selected from the group consisting of the DC offset compensation operation and the amplitude compensation operation. The DC offset and amplitude compensation device performs the DC offset compensation operation by adding a specific DC offset compensation value to the transmission data. The DC offset and amplitude compensation device performs the amplitude compensation operation by multiplying the transmission data by a specific amplitude compensation value.

In accordance with a further additional feature of the invention, there is provided, a weighting device multiplying the transmission data by a weighting factor to obtain weighted transmission data. The weighting device is connected upstream from the spread coding device.

In accordance with yet an added feature of the invention, there is provided, an oversampling device configured between the weighting device and the spread coding device. The oversampling device uses a specific sampling factor to oversample the weighted transmission data output from the weighting device.

In accordance with yet an additional feature of the invention, the sampling factor of the oversampling device enables a maximum chip rate to be obtained when the spread coding device subsequently codes the transmission data.

In accordance with yet another feature of the invention, there is provided, a channel adding device configured between the spread coding device and the scrambling device. The transmission data that is being obtained by the weighting device is transmission data from a plurality of physical channels. The weighting device separately weights the transmission data from each one of the physical channels to obtain weighted transmission data for each one of the physical channels. The spread coding device separately codes the weighted transmission data from each one of the physical channels using a channel-specific spread code. After being coded by the spread coding device, the channel adding device combines the transmission data from the physical channels to form an I branch carrying transmission data and a Q branch carrying transmission data. The scrambling device and the signal processing device obtain the transmission data being carried by the I branch separately from the transmission data being carried by the Q branch.

In accordance with yet a further feature of the invention, the apparatus is used in combination with an interface unit and a processor device having a control bus. The interface unit connects the apparatus to the control bus. The processor device uses the interface unit to transmit control data to the apparatus to control operation of the apparatus.

In accordance with an added feature of the invention, the interface unit includes a memory device connected to the apparatus. The memory device is for storing the control data transmitted from the processor device.

In accordance with an additional feature of the invention, the apparatus and the interface unit are formed as hardware, and the processor device is formed as firmware.

In summary, according to the invention, the transmission data is first coded in the normal way using a spread or channelization code and is thus band-spread, and is then coded using a scrambling code. The scrambling process is followed by pulse shaping, frequency correction, and DC offset compensation and/or amplitude compensation that is carried out in the signal path downstream from the frequency correction in order to preprocess the transmission data before it is passed on to a RF interface, from which it is transmitted via a communication channel to a receiver.

RRC filtering with a so-called roll-off factor of approximately 0.22 can be used for pulse shaping, with the band-spread and scrambled transmission data preferably being oversampled using a specific factor, at the same time.

Digital frequency offset correction can be used for frequency correction, using the so-called CORDIC algorithm, while a specific DC offset compensation value is added to the transmission data for DC offset compensation, and a specific amplitude compensation value is multiplied by the transmission data for amplitude compensation.

Before it is coded using the spread code, the transmission data is preferably weighted by being multiplied by a weighting factor, and is then over-sampled. The weighting, oversampling, and spread coding are preferably carried out separately for the transmission data for the various physical channels, in which case, after being coded using the individual spread codes, the transmission data of the physical channels is combined to form an I branch and a Q branch. The transmission data that is carried via the I branch and the Q branch is then scrambled, and is subjected to pulse shaping, frequency correction and DC offset and/or amplitude compensation, which is separately carried out in the signal path downstream from the frequency correction. A factor that corresponds to the highest spread factor for the individual spread codes is preferably used for the oversampling process that is carried out after the weighting process.

A hardware modulator, in particular, is provided for the production and processing, as already described above, of the spread-modulated or spread-coded signals. This modulator accesses various programmable memories or registers in which control data required for operating the modulator is stored. This register is preferably programmed via a control bus by a digital signal processor (DSP) that is in the form of firmware, thus ensuring a high level of flexibility, since further mobile radio standards can also still be included retrospectively just by modifying the software. The programmable registers therefore, allow the functionality of the modulator to be influenced without changing the hardware.

Other features which are considered as characteristic for the invention are set forth in the appended claims.

Although the invention is illustrated and described herein as embodied in a method and apparatus for producing spread-coded signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a detailed illustration of the bus interface shown in FIG. 2;

FIG. 7 shows various preamble identifications; and

FIG. 8 shows one possible configuration of the preamble spread code generator shown in FIG. 3.

DESCRIPTION OF THE PREFERRED EMBODIMENTS

Figure 2:
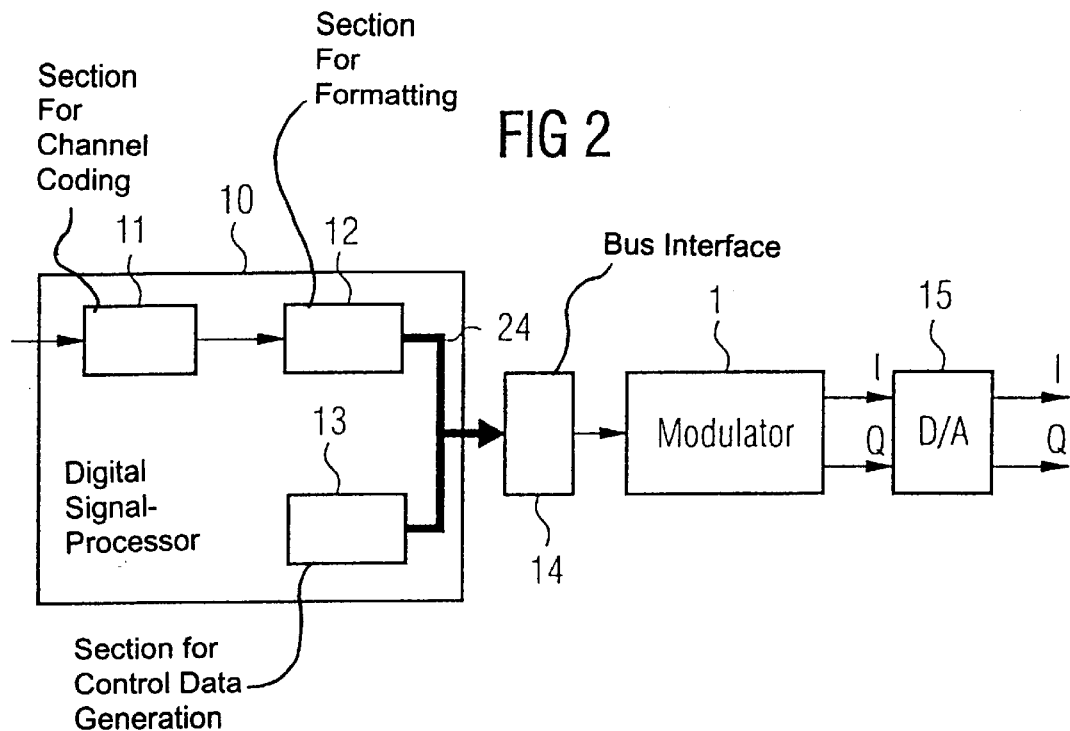
FIG. 2 is a block diagram showing the modulator of FIG. 1 connected to a digital signal processor and to a D/A converter of a mobile radio.

Referring now to the figures of the drawing in detail and first, particularly, to FIG. 2 thereof, there is shown an inventive CDMA modulator 1 that is connected to further components in a mobile radio. The CDMA modulator 1 is used for spreading signals of various physical channels. These signals are supplied via a bus interface 14. As will be explained in more detail in the following text, the modulator 1 modulates both data channels (DPDCH, "Dedicated Physical Data Channel") and control channels (DPCCH, "Dedicated Physical Control Channel"). Furthermore, the modulator 1 also spreads a so-called "Physical Random Access Burst". The spreading process essentially includes channelization and scrambling of the data that will be transmitted. The spread-modulated transmission data, which is spread between an I path and a Q path, is preprocessed in a manner that will be described in more detail in the following text, and is output via a D/A converter 15 to the RF interface of the mobile radio, in order to be transmitted from there to a corresponding receiver.

A bus interface 14 connects the modulator 1 to a control bus 24. The modulator 1 receives both control data and transmission data from a digital signal processor 10 via this control bus 24.

The digital signal processor 10 includes a section 11 for subjecting the transmission data, which is modulated onto an RF carrier signal, to channel coding (for example using a Convolutional Code). The channel coding is performed to multiplex the transmission data after an interleaving procedure, and to map the transmission data onto a number of physical data channels (DPDCH) and a physical control channel (DPCCH). The data channels contain the actual communication information, while the control channel has control information (for example, bits for controlling the transmission power, known pilot bits for channel estimation or format identification bits, etc.) for the mobile radio system, and for the base station that is communicating with that mobile radio. The transmission data, having been preprocessed in this way, is passed on to a section 12, where it is formatted, that is to say, it is embedded in a specific frame and time slot structure. When so-called "random access bursts" are transmitted, a preamble with a duration of 1 ms is transmitted. Section 12 also generates the symbols for this preamble. Furthermore, the digital signal processor 10 has a section 13, which essentially generates control data for the modulator 1. As will be explained in more detail in the following text, this control data includes, in particular, the weighting factors and the spread codes/spread factors that will be used by the modulator 1 as well as control information for frequency correction and DC offset and amplitude compensation that will be carried out by the modulator 1. The control data thus allows various functions of modulator 1 to be programmed.

While the digital signal processor 10 together with its sections 11–13 is preferably in the form of firmware, the modulator 1, together with the bus interface 14 and the D/A converter 15, is in the form of hardware. The capability to program the modulator 1 via the digital signal processor 10 results in a high level of flexibility, since the spread modulation that will be carried out by the modulator 1 can thus easily be matched to different mobile radio standards, without needing to modify the hardware for this purpose.

Figure 1:
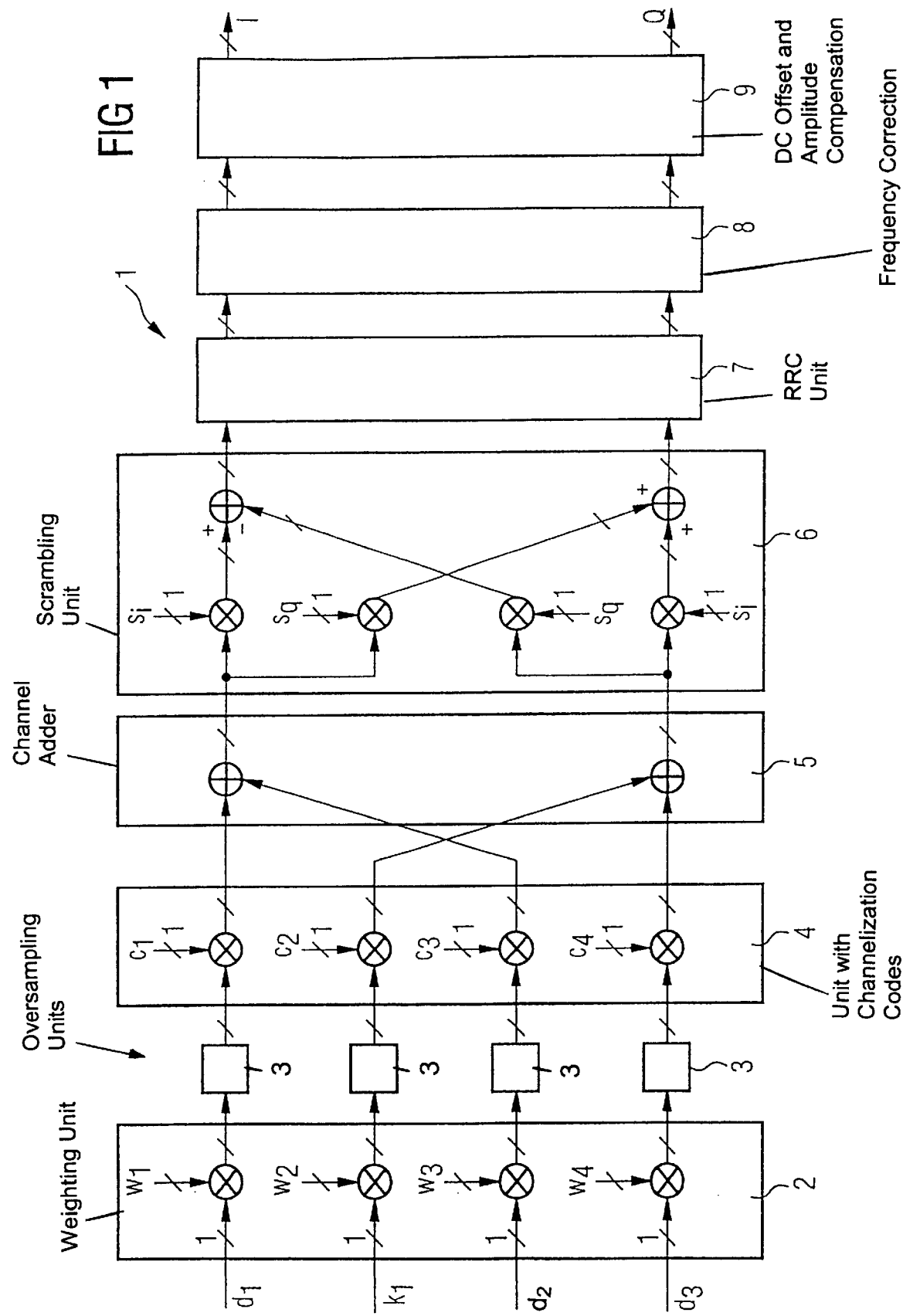
FIG. 1 is a block diagram of an exemplary embodiment of an inventive modulator.

FIG. 1 shows the detailed configuration of the modulator 1. The modulator 1 is configured, in particular, for transmitting four physical channels, namely a physical control channel k1 and three physical data channels d1–d3. The data modulation that is used corresponds to two-channel QPSK modulation (Quadrature Phase Shift keying), with the four physical channels being passed via one I branch and one Q branch.

First of all, the input symbols (which arrive at the symbol clock rate $1/T_s$) of the digital modulator 1 are supplied to a weighting unit 2, where they are weighted using channel-specific weighting factors w1–w4, in order to compensate for power differences between the individual channels when different spread factors are used. The transmission words that result from this are then oversampled in units 3, using a factor such that the full chip rate is achieved. The spread factor may vary, for example, between 4 and 512, and is loaded from the digital signal processor 10 via the control bus 24 into the bus interface 14 of the modulator 1, so that the modulator 1 can access this value. The oversampling process thus increases the sampling rate to $1/T_c=SF*1/T_s$.

The coding or channelization of the individual channels is then carried out in the unit 4 by using channel-specific spread or channelization codes c1–c4. The channelization process transforms each data symbol to a specific number of so-called chips. The number of chips per data symbol resulting from this corresponds to the spread factor (SF).

The preprocessed and band-spread signals obtained in this way are then added in a channel adder 5 as shown in FIG. 1. In the exemplary embodiment shown in FIG. 1, the individual data symbols of the channels d1 and d2 are added together, and the individual data symbols of the channels d3 and k1 are added together such that the data symbols are split between an I branch and a Q branch.

The band-spread signals are multiplied in a scrambling unit 6 by the symbols si and sq on a complex scrambling code. Finally, the signals of the I branch and of the Q branch are subjected to signal preprocessing in the unit 7 (for example, an RRC or Root Raised Cosine unit), in the frequency correction unit 8, and in the DC offset and amplitude compensation unit 9.

In this case, the so-called RRC unit 7, in principle, corresponds to a digital filter and is used to achieve optimum band limiting with an optimum frequency response at the same time, by RRC pulse shaping. In this case, it is possible in particular to use RRC pulse shaping with a so-called roll-off factor of 0.22. The RRC unit 7 also carries out oversampling on the I and Q signals supplied to it, using a factor M, where M may, in particular, have the value 4.

The frequency correction unit 8 carries out digital frequency correction for the signals supplied by the I branch and Q branch, preferably using the so-called CORDIC (Coordinate Rotation Digital Computer) algorithm. This is an iterative algorithm, which can be used to eliminate a specific frequency offset. The general principles of the CORDIC algorithm are described, for example, in "The CORDIC Trigometric Computing Technique", J. E. Volder, IRE Trans. Electronic Computers, vol. 8, pages 330–334, 1959, or "A Unified Algorithm for Elementary Functions", J. S. Walther, Spring Joint Conference pages 370–385, 1971.

In the present case, the CORDIC algorithm is used in the trigonometric coordinate system, with an input vector being rotated by the value pair $(I_n, Q_n)$ through the predetermined angle:

$\alpha_n = \arctan(2^{-n})$ where $n = 0, 1, \ldots, N-1$.

In this case, N is the iteration length.

The angle sequence $\{\alpha_0, \alpha_1, \ldots, \alpha_{N-1}\}$ where $\alpha_0 > \alpha_1 > \ldots > \alpha_{N-1}$ is defined such that an angle z, which satisfies the condition $|z| \leq D$ where $D = \alpha_0 + \alpha_1 + \ldots + \alpha_{N-1}$, can in each case be represented by a suitable linear combination of the individual angles $\alpha_n$:

$z = \sigma_0 \alpha_0 + \sigma_1 \alpha_1 + \ldots + \sigma_{N-1} \alpha_{N-1}$ where $\sigma_n = \pm 1$ In this case, D denotes the convergence range.

In this way, the input vector $(I_n, Q_n)$ is not rotated directly through the angle z, but through a sequence of N successive "microrotations" through the smaller angle $\sigma_n \alpha_n$. In this case, $\sigma_n$ corresponds to the mathematical sign of the nth microrotation, which is defined as a function of the angle z.

The fundamental idea of the CORDIC algorithm is to produce all the microrotations by simple shift and add processes:

$I_{n+1} = I_n - \sigma_n 2^{-n} Q_n$ $Q_{n+1} = \sigma_n 2^{-n} I_n + Q_n$

As can be derived from the above formula for $\alpha_n$, the vector $(I_N, Q_N)$ can thus be represented as a function of the vector $(I_0, Q_0)$:

$$\begin{bmatrix} I_N \\ Q_N \end{bmatrix} = K \begin{bmatrix} \cos(z) & -\sin(z) \\ \sin(z) & \cos(z) \end{bmatrix} \begin{bmatrix} I_0 \\ Q_0 \end{bmatrix}$$

where $$K = \prod_{n=0}^{N-1} \sqrt{1 + 2^{-2n}} \approx 1.6$$

K is in this case a constant scaling factor, which is independent of the rotation angle z.

Figure 6:
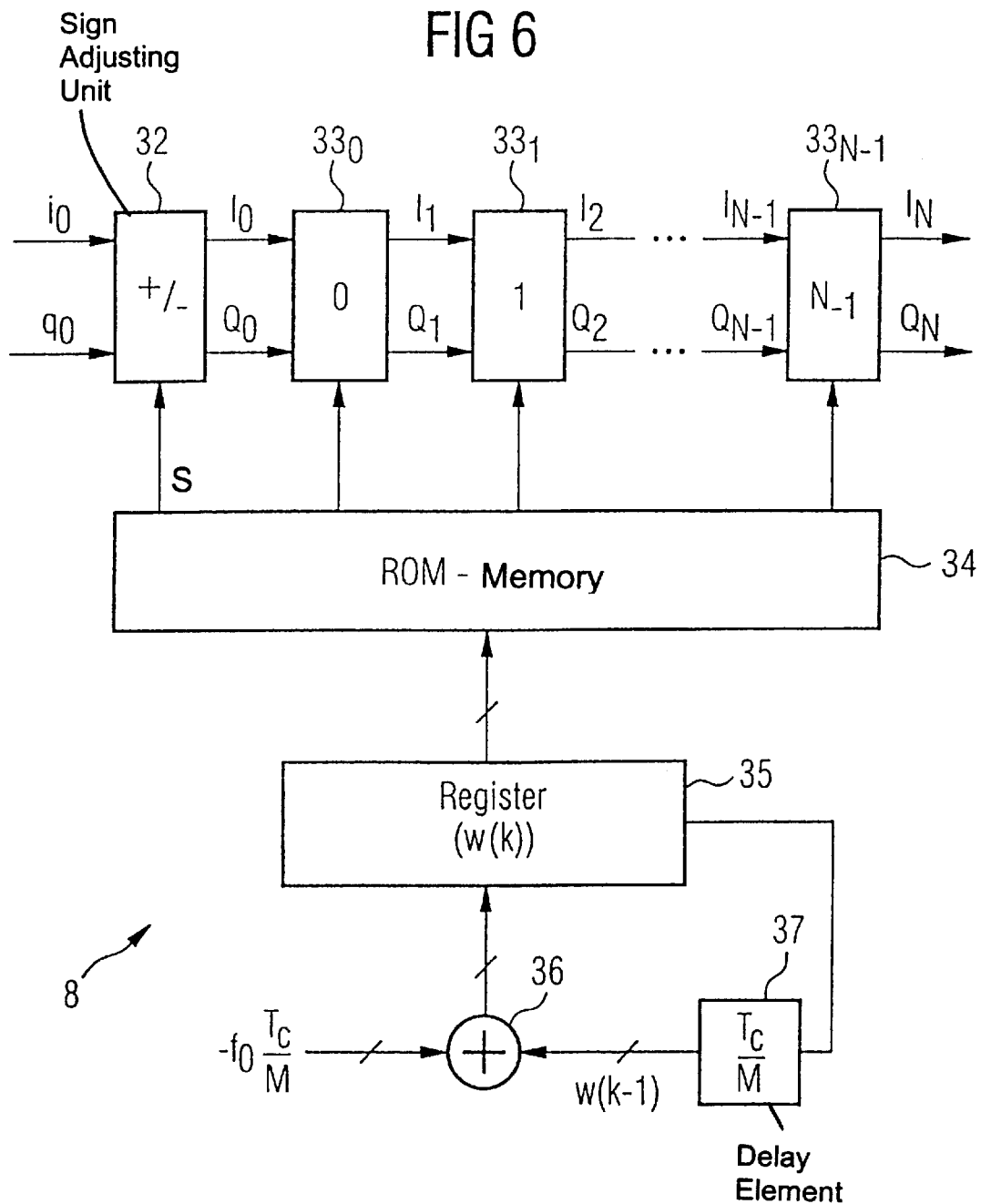
FIG. 6 shows one possible configuration of the digital frequency correction unit that is shown in FIG. 1 and that is operated using the so-called CORDIC algorithm.

FIG. 6 shows a circuit arrangement of the frequency correction unit 8 in order to provide automatic frequency correction using the CORDIC algorithm. In this case, it is assumed that $f_0$ represents the frequency offset that will be corrected, $T_c$ represents the reception bit period and M represents the oversampling factor of the baseband signal that will be processed using the CORDIC algorithm.

The complex baseband signal i(k)+jq(k) (k denotes the sample index) which is defined by the signal components i(k) and q(k) is multiplied by exp(jz(k)) where:

$$z(k) = -2\pi f_0 \frac{T_c}{m} k$$

This multiplication is carried out by using the CORDIC algorithm, with the phase accumulation being carried out by the accumulator 36 shown in FIG. 6. A control unit 34, which is in the form of an ROM memory, is used to produce the rotation mathematical signs $\sigma_0 \ldots \sigma_{N-1}$ which are required to drive the individual microrotation units $33_0 \ldots 33_{N-1}$. The iteration length may, for example, be N=16, so that 16 microrotation units are provided, in a corresponding manner.

As has already been mentioned, the CORDIC algorithm processes only angles z for which $|z| \leq D$. If N=16 then D~99°. The angle or phase increment for each bit period may, however, be sufficiently large that the value z(k) can reach values of more than 360° during one burst.

Thus, in the circuit arrangement shown in FIG. 6, the angle z is reduced such that it is never more than 90°. For this purpose, and as shown in FIG. 6, the value w(k)=w(k−1)−$f_0 T_c$ is accumulated with the aid of the accumulator 36 and a delay element 37, such that:

$$w(k) = \frac{z(k)}{2\pi}$$

The bit pattern 111 ... 111 of w(k) corresponds, when using the fixed-point representation, to the maximum value w(k)~1 or z(k)=~2π.

Modulo operation w(k) mod 1 or z(k) mod 2π is thus produced, so that the angle z(k) is always restricted to the value range $0 \leq z(k) \leq 2\pi$.

The individual values w(k) are stored in the register 35 shown in FIG. 6, and are used for driving the ROM memory 34, as will be explained in more detail in the following text.

The CORDIC algorithm gives good results provided the phase angle z(k) is located in the first or fourth quadrant. Thus, with the circuit arrangement shown in FIG. 6, the mathematical sign of i(k) and q(k) is multiplied by −1 if z(k) is located in the second or third quadrant. The value pair (−i(k), −q(k)) is then rotated through the angle z(k)-π, with the certainty that this angle is located in the fourth or first quadrant. This task is carried out by the sign adjusting unit 32 shown in FIG. 6, which optionally inverts or leaves unchanged the mathematical sign of i(k) and q(k) depending on a control signal S from the ROM memory 34.

The ROM memory 34 is designed such that corresponding values for s and $\sigma_0 \ldots \sigma_{N-1}$ can be read directly for each value w(k)=($w_0, w_1, \ldots, w_{N+1}$), where $w_0$ represents the most significant bit (MSB) of w(k). The mathematical sign flag S can in this case be determined directly by the logic operation $w_0$ XOR $w_1$ since these two bits define the quadrant of the phase angle z(k). The mathematical sign of the first microrotation $\sigma_0$ is always identical to $w_1$, since $\sigma_0$ is always equal to +1 for the first rotation direction in the first and third quadrants.

In contrast, the remaining N−1 mathematical signs $\sigma_1 \ldots \sigma_{N-1}$ are derived from the other N bits $w_1, w_2, \ldots, w_{N+1}$ of the w(k) register 35. The ROM memory 34 can in consequence be designed in the form of an N bit x (N−1) bit table in conjunction with an XOR gate. The corresponding values for the mathematical signs $\sigma_0 \ldots \sigma_{N-1}$ are stored in this ROM table for each combination of the bits $w_1, w_2, \ldots, w_{N+1}$.

The DC offset and amplitude compensation unit 9 is used for DC offset and amplitude compensation. It is configured such that the transmission words that arrive in the I branch and Q branch are initially multiplied by an amplitude compensation value, and then have a DC offset compensation value added to them. The unit 9 can thus easily be formed by a multiplier/adder structure that can be provided, in each case, for the I branch and Q branch. A value range from −1023 to 1023 can preferably be used for the DC offset compensation value, and a value range of 0 ... 1023 can preferably be used for the amplitude compensation value.

Now that the configuration of the modulator 1 has been described in detail, the following text will describe, in more detail, the configuration of the bus interface 14 shown in FIG. 2, and its interaction with the digital signal processor 10 and with the digital modulator 1.

As has already been mentioned, in addition to the actual transmission data, the digital signal processor 10 transmits a certain amount of control data or control information to the modulator 1 to control or program the operation of the modulator 1. This control data is transmitted through the control bus 24. The bus interface 14 thus has various buffers or registers in which the information transmitted from the digital processor 10 is stored.

For the transmission data of the physical channels d1–d3 and k1, the bus interface 14 of the digital modulator 1 has an input buffer 16 in which the corresponding transmission symbols of the individual physical channel are stored once per time slot ("slot") by the digital signal processor 10. When a preamble is going to be transmitted, a control signal which is applied to the input buffer 16 and has either the value "slot_preamb_f" or "slot_preamb_r", makes it possible to select the data for a normal preamble or for a "Random Access Burst" preamble. If this control signal has the value "slot preamb_r", that is to say the intention is to transmit a preamble for a "Random Access Burst", only the "1" values which have been applied to the input buffer 16 are supplied via the input buffer 16 to the modulator 1.

In contrast, the other components of the bus interface 14 that are shown in FIG. 1 are intended for the control data of the digital signal processor 10. The weighting factors for the four physical channels are transmitted once per connection from the digital signal processor 10, and are stored in a weighting register 17. These weighting factors or the binary value "1" can in each case optionally be applied to the weighting unit 2 of the digital modulator 1 via a multiplexer 18 which, analogously to the input buffer 16, receives the control signal "slot_preamb_f/slot_preamb_r".

Figure 4:
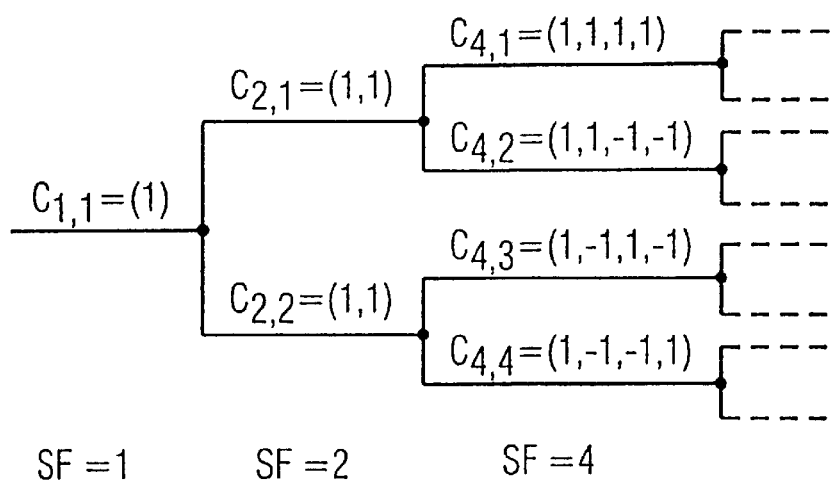
FIG. 4 is a code tree for generating so-called OVSF spread or channelization codes.

Furthermore, once per connection, the digital signal processor 10 transmits the channelization codes to a RAM memory 19 with areas intended for the individual physical channels (d1 ... d3, k1), in which the corresponding spread or channelization code information is stored for each physical channel. Each channelization code corresponds to a binary sequence of length SF, and is generated by an appropriate algorithm in the digital signal processor 10 or in the section 13 shown in FIG. 2. FIG. 4 shows an example of a code tree for generating (which is carried out by the digital signal processor 10) so-called OVSF codes $c_i,j$ ("Orthogonal Variable Spreading Factor") for various spread factors SF. The index i corresponds to the respective spread factor, and the index j indicates the respective code number. In this case, it should be remembered that the binary values "1" and "0" have been mapped onto the values "+1" and "−1".

Figure 5:
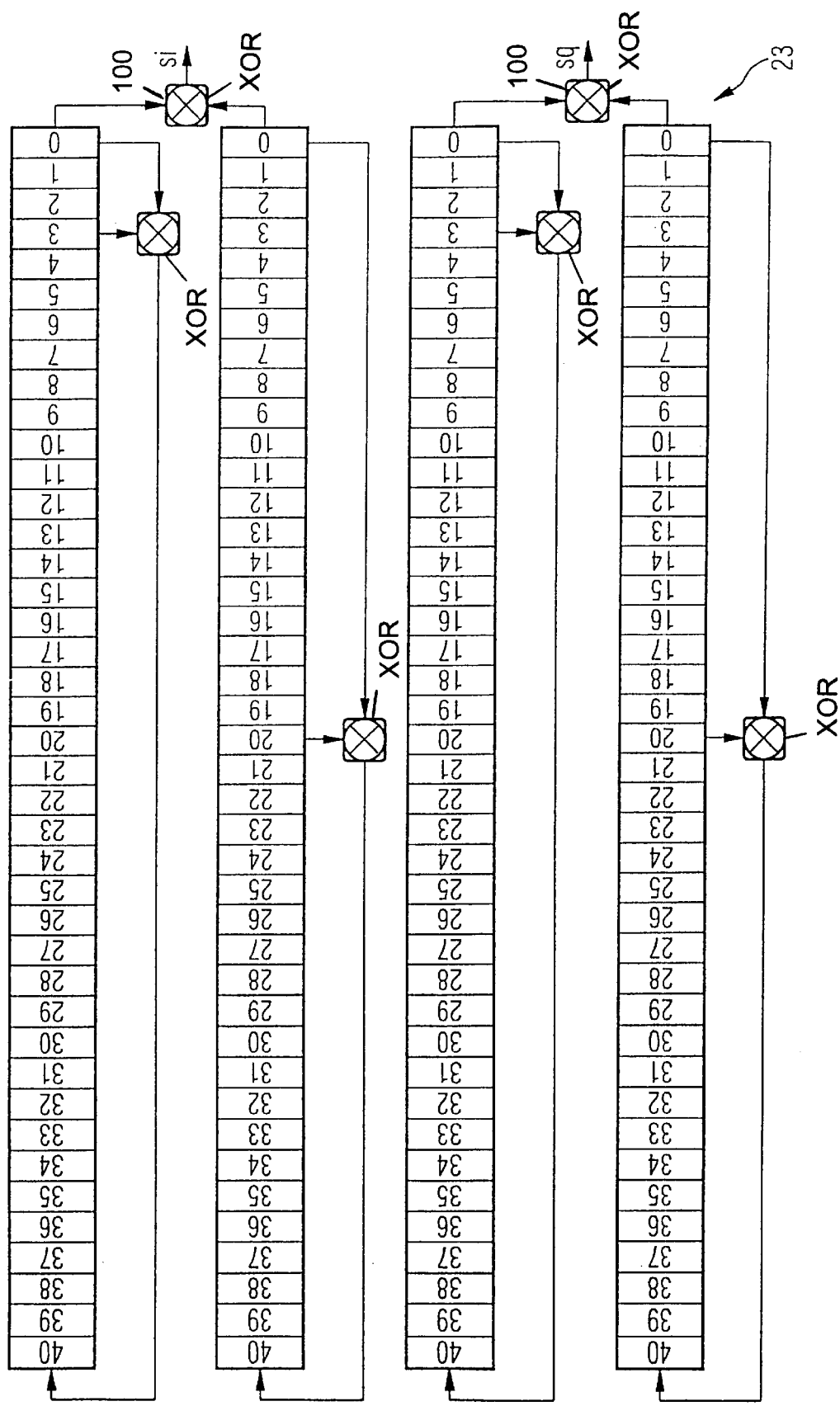
FIG. 5 shows one possible configuration of the spread code generator shown in FIG. 3.

Furthermore, the bus interface 14 which is associated with the digital modulator 1 has a scrambling code generator 23, which interacts with two registers 21 and 22 in order to generate the complex scrambling code. The digital signal processor 10 transmits presetting values for the real part si of the scrambling code to the register 21, via the control bus 24, as soon as the corresponding mobile radio has been switched on or when a handover process has been initiated. FIG. 5 shows one possible configuration of the scrambling code generator 23. It can be seen that the scrambling code generator 23 essentially includes two shift register arrangements with shift register chains connected in parallel by XOR gates 100. The upper shift register arrangement in FIG. 5 is provided for generating the real part si and the lower shift register arrangement is provided for generating the imaginary part sq of the scrambling code. In order to generate the scrambling code, the two first shift registers of the real part shift register arrangement are first of all set to the initial values of the register 21, which has in turn previously been set by the digital signal processor 10, as already explained. The upper shift register arrangement is then operated for a period of 1024 cycles starting from these initial values, in order then to store the shift register values that result from this as initial values in the register 22 for the shift registers in the imaginary part shift register arrangement. This means that the initial values for the imaginary part sq of the scrambling code are generated within the modulator 1 or its bus interface 14. The contents of the imaginary part register 22 can then be read and evaluated by the digital signal processor 10, for test purposes. Once the real part register 21 and also the imaginary part register 22 have been set, in this way, to the initial values for the shift register chains shown in FIG. 5, all of the shift registers in the two shift register arrangements are set during operation to their corresponding initial values from the real part register 21 or the imaginary part register 22. This is done in synchronism with a frame synchronization signal, that is to say the shift registers are each set to their initial values once per frame. As will be explained in more detail in the following text, the multiplexer 20 that is shown in FIG. 3 is intended, in an analogous manner to the multiplexer 18, to pass on, instead of the output values from the scrambling code generator 23, the input values of the multiplexer 18 (which are required to generate this preamble and are supplied from a preamble spread code generator with the components 25, 26 and 28) when a "Random Access Burst" preamble will be transmitted.

It has already been mentioned that a preamble with a duration of 1 ms is transmitted in the case of a "Random Access Burst". In this case, the multiplexers 18 and 20 use a control signal "slot_preamb_r" to switch all of the access lines of the modulator 1 that connect the modulator 1 to the weighting register 17, to the channelization code memory 19, and to the scrambling code generator 23. The control signal "slot_preamb r" switches these access lines to the preamble spread code generator components, that is to say to registers 25, 26 and the multiplexer 28. The preamble has, for example, one of 16 different orthogonal complex identifications of length 16, with a list containing the available identifications being transmitted from the corresponding base station to the mobile radio. The respectively selected identification is loaded from the digital signal processor 10 into an identification register 25, via the control bus 24. By way of example, FIG. 7 shows a list of the available preamble identifications. As is also shown in FIG. 8, the individual identification symbols are multiplexed by a multiplexer and are sampled by an oversampling unit 3 at, for example, 3.84 MHz or at a rate of 3840 sample values per second, so that each symbol stored in the identification register 25 is repeated 256 times, in order in this way to fill the 1 ms time slot for the preamble. A "1" or "−1" value is respectively generated for the I branch or Q branch for each chip in this way, and is applied as the respective spread code symbol c1 or c2 to the multiplexer 20. The two other spread code symbols c3 and c4 are, in contrast, always set to "0", as is also shown in FIG. 3.

The digital signal processor 10 also transmits initial values to the bus interface 14 for the preamble spread code that will be generated. These initial values are stored in the preamble spread code registers 26. FIG. 8 likewise illustrates the configuration of the preamble spread code registers 26 and the generation of the spread codes resulting from them, from which it can be seen that only bits for the real part si of the complex spread code are generated with the preamble spread code registers 26, which are preferably operated at 3.84 MHz, while the imaginary part sq is always set to the value of "0" (see also FIG. 3).

In addition to the control data described above, the digital signal processor 10 also transmits control data via the control bus 24, for operation of the units 8 and 9 (see FIG. 1). Once per time slot, the digital signal processor 10 thus loads a frequency correction value in a frequency correction register 29, a DC offset compensation value into a DC offset register 30, and an amplitude compensation value into a amplitude compensation register 31. The frequency correction unit 8 is then operated with the value stored in the register 29, while the DC offset and amplitude compensation unit 9 is operated with the values stored in the registers 30 and 31. Even though this is not provided in the described exemplary embodiment, it is in principle also feasible to program the RRC unit 7 in an analogous manner.

We claim:

1. A method for producing spread-coded signals, which comprises:

coding and band-spreading transmission data using a spread code to obtain band-spread transmission data;

coding the band-spread transmission data using a scrambling code to obtain band-spread and scrambled transmission data and then pulse shaping the band-spread and scrambled transmission data;

subjecting the band-spread and scrambled transmission data to digital offset frequency correction;

using a rotation angle for the frequency correction being represented as a linear combination of microrotations;

performing the microrotations by selectively using a CORDIC algorithm as a function of a frequency offset; and subjecting the band-spread and scrambled transmission data to an operation selected from the group consisting of a DC offset compensation operation and an amplitude compensation operation.

2. The method according to claim 1, which comprises: performing the pulse shaping by Root Raised Cosine filtering with a roll-off factor of approximately 0.22.

3. The method according to claim 2, which comprises: during the pulse shaping, oversampling the band-spread and scrambled transmission data using a specific oversampling factor.

4. The method according to claim 1, which comprises: during the pulse shaping, oversampling the band-spread and scrambled transmission data using a specific oversampling factor.

5. The method according to claim 4, wherein the oversampling factor is four.

6. The method according to claim 1, which comprises:
performing both the DC offset compensation operation and the amplitude compensation operation;
performing the DC offset compensation operation by adding a specific DC offset compensation value to the band-spread and scrambled transmission data; and
performing the amplitude compensation operation by multiplying the band-spread and scrambled transmission data by a specific amplitude compensation value.

7. The method according to claim 1, which comprises:
before the transmission data is coded using the spread code, weighting the transmission data by multiplying the transmission data by a weighting factor; and subsequently
oversampling the transmission data.

8. The method according to claim 7, which comprises:
using an over-sampling factor to perform the step of oversampling the transmission data such that when the subsequent step of coding the transmission data using the spread code is performed, a maximum chip rate is obtained.

9. The method according to claim 8, which comprises performing the step of coding and band-spreading the transmission data, the step of coding the band-spread transmission data using the scrambling code, the step of pulse shaping the band-spread transmission data, the step of frequency correction, and the step of oversampling the transmission data by:
obtaining the transmission data from a plurality of physical channels, each providing first transmission data;
for each one of the plurality of the physical channels and separately from others of the plurality of the physical channels, weighting, oversampling, and coding the first transmission data using a channel-specific spread code;
after being coded using the spread code, combining the first transmission data of the plurality of the physical channels to form an I branch carrying second transmission data and a Q branch carrying third transmission data;
scrambling the second transmission data, and then pulse shaping the second transmission data, frequency correcting the second transmission data, and subjecting the second transmission data to an operation selected from the group consisting of a DC offset compensation operation, and an amplitude compensation operation; and
separately from the second transmission data, scrambling the third transmission data, and then pulse shaping the third transmission data, frequency correcting the third transmission data, and subjecting the third transmission data to an operation selected from the group consisting of a DC offset compensation operation, and an amplitude compensation operation.

10. The method according to claim 7, which comprises performing the step of coding and band-spreading the transmission data, the step of coding the band-spread transmission data using the scrambling code, the step of pulse shaping the band-spread transmission data, the step of frequency correction, and the step of oversampling the transmission data by:
obtaining the transmission data from a plurality of physical channels, each providing first transmission data;
for each one of the plurality of the physical channels and separately from others of the plurality of the physical channels, weighting, oversampling, and coding the first transmission data using a channel-specific spread code;
after being coded using the spread code, combining the first transmission data of the plurality of the physical channels to form an I branch carrying second transmission data and a Q branch carrying third transmission data;
scrambling the second transmission data, and then pulse shaping the second transmission data, frequency correcting the second transmission data, and subjecting the second transmission data to an operation selected from the group consisting of a DC offset compensation operation, and an amplitude compensation operation; and
separately from the second transmission data, scrambling the third transmission data, and then pulse shaping the third transmission data, frequency correcting the third transmission data, and subjecting the third transmission data to an operation selected from the group consisting of a DC offset compensation operation, and an amplitude compensation operation.

11. The method according to claim 1, which comprises:
using a modulator to perform the step of coding and band-spreading the transmission data, the step of coding the band-spread transmission data using the scrambling code, the step of pulse shaping the band-spread transmission data, the step of frequency correction, and the operation selected from the group consisting of the DC offset operation and the amplitude compensation operation; and
programming the modulator by using a control bus to provide operating parameters to the modulator.

12. An apparatus for producing spread-coded signals, comprising:
a spread coding device for coding transmission data using a spread code to obtain spread-coded transmission data, the transmission data being for subsequent transmission;
a scrambling device for scrambling the spread-coded transmission data with a scrambling code; and
a signal preprocessing device receiving the transmission data from said scrambling device;
said signal preprocessing device including a device for pulse shaping;
said signal preprocessing device including a device for digital frequency correction;
said digital frequency correction device including microrotation units connected in series;
said microrotation units using a CORDIC algorithm for correcting any frequency offset and being driven selectively as a function of the frequency offset; and
said signal preprocessing device including a given device for performing an operation selected from the group consisting of a DC offset compensation operation and an amplitude compensation operation.

13. The apparatus according to claim 12, wherein:
said device for pulse shaping includes a Root Raised Cosine filter device for pulse shaping.

14. The apparatus according to claim 13, wherein:
said Root Raised Cosine filter device has a roll-off factor of approximately 0.22.

15. The apparatus according to claim 14, wherein:
during a pulse shaping process, said Root Raised Cosine filter device uses a specific oversampling factor to oversample the transmission data output from said scrambling device.

16. The apparatus according to claim 13, wherein:

during a pulse shaping process, said Root Raised Cosine filter device uses a specific oversampling factor to oversample the transmission data output from said scrambling device.

17. The apparatus according to claim 12, wherein:

said given device includes a DC offset and amplitude compensation device for performing the operation selected from the group consisting of the DC offset compensation operation and the amplitude compensation operation;

said DC offset and amplitude compensation device performs the DC offset compensation operation by adding a specific DC offset compensation value to the transmission data; and said DC offset and amplitude compensation device performs the amplitude compensation operation by multiplying the transmission data by a specific amplitude compensation value.

18. The apparatus according to claim 12, comprising:

a weighting device multiplying the transmission data by a weighting factor to obtain weighted transmission data;

said weighting device connected upstream from said spread coding device.

19. The apparatus according to claim 18, comprising:

an oversampling device configured between said weighting device and said spread coding device;

said oversampling device using a specific sampling factor to oversample the weighted transmission data output from said weighting device.

20. The apparatus according to claim 19, wherein the sampling factor of said oversampling device enables a maximum chip rate to be obtained when said spread coding device subsequently codes the transmission data.

21. The apparatus according to claim 19, comprising:

a channel adding device configured between said spread coding device and said scrambling device;

the transmission data being obtained by said weighting device being transmission data from a plurality of physical channels;

said weighting device separately weighting the transmission data from each one of the physical channels to obtain weighted transmission data for each one of the physical channels;

said spread coding device separately coding the weighted transmission data from each one of the physical channels using a channel-specific spread code;

after being coded by said spread coding device, said channel adding device combining the transmission data from the physical channels to form an I branch carrying transmission data and a Q branch carrying transmission data; and said scrambling device and said signal processing device obtaining the transmission data being carried by said I branch separately from the transmission data being carried by said Q branch.

22. The apparatus according to claim 21, wherein the sampling factor of said oversampling device enables a maximum chip rate to be obtained when said spread coding device subsequently codes the transmission data.

23. The apparatus according to claim 18, comprising:

a channel adding device configured between said spread coding device and said scrambling device;

the transmission data being obtained by said weighting device being transmission data from a plurality of physical channels;

said weighting device separately weighting the transmission data from each one of the physical channels to obtain weighted transmission data for each one of the physical channels;

said spread coding device separately coding the weighted transmission data from each one of the physical channels using a channel-specific spread code;

after being coded by said spread coding device, said channel adding device combining the transmission data from the physical channels to form an I branch carrying transmission data and a Q branch carrying transmission data; and said scrambling device and said signal processing device obtaining the transmission data being carried by said I branch separately from the transmission data being carried by said Q branch.

24. The apparatus according to claim 12, in combination with a an interface unit and a processor device having a control bus, wherein:

the interface unit connects the apparatus to the control bus; and the processor device uses the interface unit to transmit control data to the apparatus to control operation of the apparatus.

25. The apparatus according to claim 24, wherein:

the interface unit includes a memory device connected to the apparatus; and the memory device is for storing the control data transmitted from the processor device.

26. The apparatus according to claim 25, wherein:

the apparatus and the interface unit are formed as hardware; and the processor device is formed as firmware.

27. The apparatus according to claim 24, wherein:

the apparatus and the interface unit are formed as hardware; and the processor device is formed as firmware.

* * * * *